Figure 3:
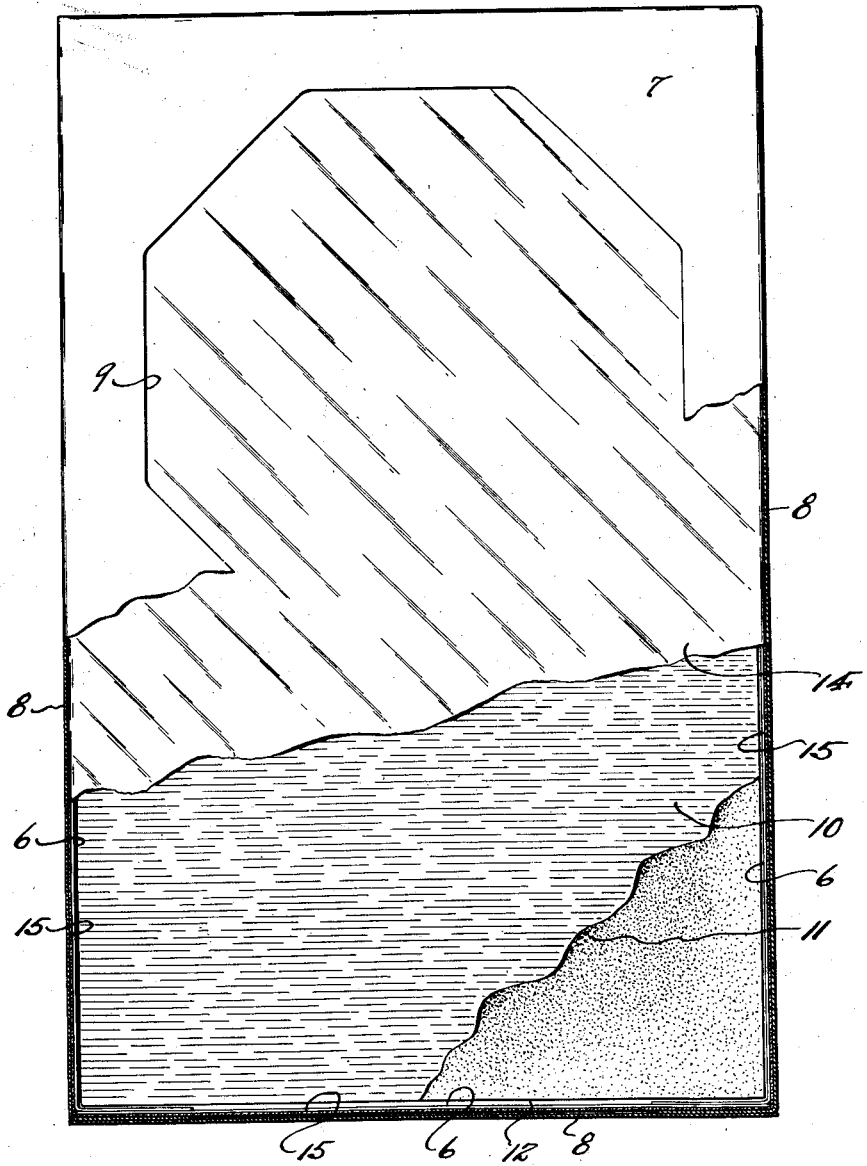

May 16, 1933.  F. W. RUZICKA  1,909,013
DISTRIBUTING PACKAGE FOR PERISHABLES
Filed May 27, 1932   2 Sheets-Sheet 1
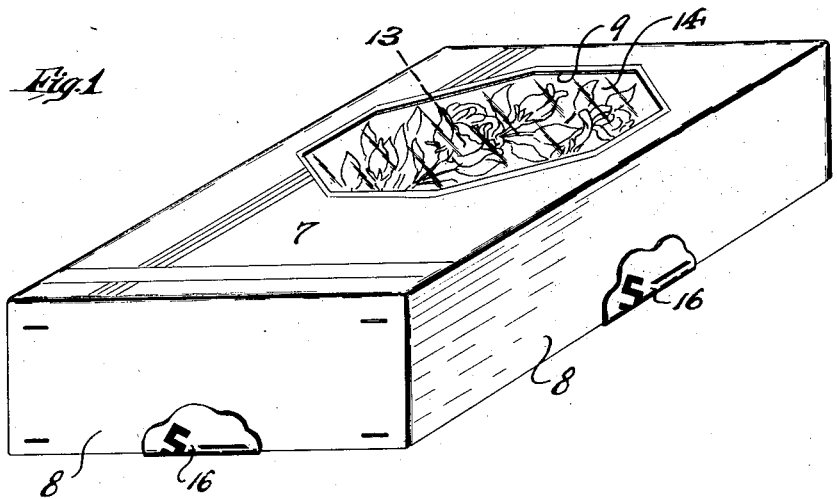
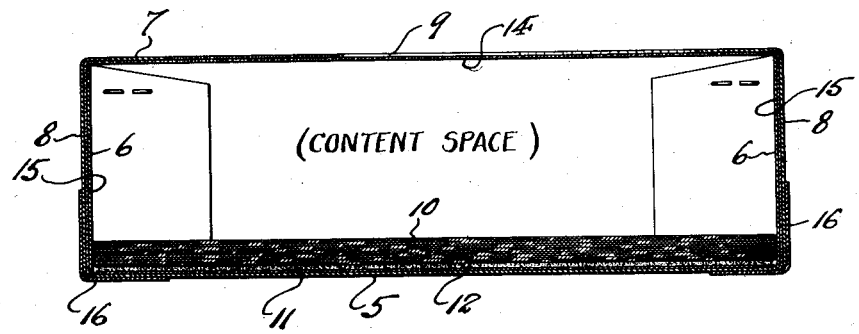
INVENTOR
Francis W. Ruzicka,
BY
George D. Richards
ATTORNEY May 16, 1933.  F. W. RUZICKA  1,909,013
DISTRIBUTING PACKAGE FOR PERISHABLES
Filed May 27, 1932  2 Sheets-Sheet 2

INVENTOR
Francis W. Ruzicka,
BY
George D. Richards
ATTORNEY

Patented May 16, 1933

1,909,013

UNITED STATES PATENT OFFICE

FRANCIS W. RUZICKA, OF CHATHAM, NEW JERSEY

DISTRIBUTING PACKAGE FOR PERISHABLES

Application filed May 27, 1932. Serial No. 613,833.

This invention relates to a novel package for the commercial distribution of cut flowers, fruits, vegetables, and other forms of horticultural and vegetable growths.

Heretofore the industry relating to commercial horticulture for the purpose of supplying cut flowers for decorative purposes has been increasingly developed, and is now a well established business. Generally demand has exceeded supply, and this has led to the establishment of large producing units from which distribution has taken place over increasingly large areas. Since, however, the usefulness and commercial value of cut flowers depend upon successful transportation from producer to retail consumer and preservation thereof during consequent transit and handling, a need has arisen for better methods of transportation and preservation than have heretofore prevailed. Heretofore speed has been essential, and it has been sought to reduce to a minimum, as far as possible, the lapse of time occuring between shipment of cut flowers by the producer and delivery thereof to the consumer, and little or no attention has been given to methods of controlling vital plant processes and conditions whereby the perservation of cut flowers during comparatively long periods of transportation and storage may be assured.

With the above conditions in view, it is the principal object of this invention to provide a novel distributing package or container for the commercial distribution and handling, from grower to consumer, of various kinds of perishables, but especially adapted for cut flowers; said container being so devised as to prolong the preservation of the content whereby the same reaches the consumer in fresh and healthy condition. To this end, the novel package or container comprises an enclosure provided with an effective seal aginst both gaseous and aqueous interchange between its interior and the outside atmosphere; with means to render the content visible; with means to cushion and support the content against damage during handling; and with integral chemical constituents for maintaining correct conditions of moisture content in the confined air within the container and for supplying oxygen in the promotion of normal respiration and the suppression of fermentation with respect to the content of the container.

Other objects of this invention, not at this time more particularly enumerated, will be understood from the following detailed description of the same.

An illustrative embodiment of this invention is shown in the accompanying drawings, in which:—

Fig. 1 is a perspective view of a sealed commercial distribution package or container according to this invention; Fig. 2 is a transverse section through the container; and Fig. 3 is in part a top plan and in part a sectional view of the container, with portions of certain elements comprising the same broken away to disclose underlying elements thereof.

Similar characters of reference are employed in the above described views, to indicate corresponding parts.

Referring to the drawings, in preferred form, the container consists in a body comprising a bottom 5 having upstanding side walls 6 and a cover comprising a top 7 having depending side walls 8; said cover being adapted to fit telescopically over said body. Said body and cover are suitably constructed of comparatively stiff paperboard, which is suitably treated to render the same moisture and gas resistant, as by coating either its inner and outer surfaces, or both, with a varnish or similar coating so as to render the paperboard composing the same substantially impervious to water and air. The top 7 of the cover is provided with a conveniently disposed and suitably shaped opening 9 through which the content enclosed in the container may be viewed.

Disposed within the body of the container, preferably coextensive with the bottom 5 thereof, is a layer of cushioning material 10 of substantial thickness. Any soft, resilient and absorbent material may be used to provide the cushioning element 10, but I have found that a laminate body of sheeted fibrous cellulose material, such as that produced from wood pulp, is admirably adapted for the purpose, not only by reason of its soft and resilient body, but also because of its open porous and absorbent character which is readily adapted to permit passage of moisture and gas under the control of certain chemical constituents utilized within the container for purposes to be subsequently more fully explained. The reference character 11 indicates a layer or sprinkling of chemical constituents, usually in pulverized or powdered form, which is placed beneath the cushioning element 10. If desired, a bottom sheet 12 may be utilized to underlie said layer of chemical constituents.

After the product to be enclosed in the container, as, for example, cut flowers indicated by the reference character 13 in Fig. 1, is deposited in the body, and preparatory to closing the container by the application of the cover to said body, a sheet of transparent gas and waterproof material 14, such e. g, as material of cellulose origin known as cellophane, is applied over the open top of the body. This sheet of transparent gas and waterproof material 14 is of an area exceeding the plan area of the body, so that marginal portions 15 thereof may be folded exteriorly and downwardly over the side walls of the body, thus closing over the entire open top of the latter. When the sheet of transparent material 14 is thus disposed, the cover is closed telescopically over the body, thereby engaging and holding the marginal portions 15 of said transparent material engaged between the side walls 6 of the body and the depending sides 8 of the cover, while at the same time a portion of sheet of transparent material, as spread over the open top of the body above the deposited content, underlies and thus closes the cover opening 9 against the passage of air or moisture, while nevertheless, because of the transparent character of the material, still permitting visual observance of the product enclosed within the container. The described assembled relation thus attained between the sheet material 14—15 and the closed together body and cover of the container establishes an effective seal between the body and cover of the container which is calculated to prevent both gaseous and aqueous interchange between the outside atmosphere and the closed interior of the container, whereby effective control of moisture and gas conditions within the container, best adapted to the healthful preservation of the enclosed product, may be assured through the operation of the chemical constituents with which the interior of the container is provided.

The chemical constituents contained in the layer or sprinkling 11 above referred to, comprise a moisture control material, such as chloride of lime, and an oxygen yielding material, such as sodium perborate.

To properly maintain a minimum moisture content in the air confined within the container, the absorbent cushioning element 10 is lightly sprinkled with water, either as a separate operation, preparatory to deposit of the flowers in the container, or as drippings from the flowers which have been sprinkled with water prior to deposit. The moisture thus initially provided will be taken up by the chloride of lime, by reason of the great molecular affinity for water which this substance possesses; and consequently such moisture will be stored subject to release should the vapor pressure of the confined air content of the container, after the latter is sealed, later be lowered, in which event a perceptible amount of moisture will be liberated (sufficient for minimum requirement of the enclosed flowers) by the chloride of lime. It will thus be obvious that the chloride of lime acts as a balancing moisture control with respect to the air confined within the closed and sealed container, and by preventing excess free water vapor within the container functions to prevent, or at least reduce to a marked degree, any tendency to condensation, thus forestalling the detrimental effects which such condensation, if unduly permitted, is known to have on highly perishable products, such as cut flowers, fruits and the like.

In a sealed container enclosing perishable products, such as cut flowers, fruits, etc., it is highly desirable that some provision be made for an additional supply of oxygen to preserve vitality and promote natural respiration of the enclosed product. To attain such desideratum, a quantity of sodium perborate is included in the layer of sprinkling 11 of chemical constituents. In the presence of moisture, the sodium perborate will slowly release oxygen within the container. To assure sufficient moisture for such releasal, the sodium perborate is mechanically mixed through and in close physical contact with the chloride of lime which, as above mentioned, possesses a strong affinity for water. It is not known or intended that any chemical action should take place other than the desired release of oxygen. The release of oxygen into the confined air content of the container not only permits normal aerobic respiration of the enclosed perishable products to proceed, but also prevents to a practical degree, the possibility of anaerobic respiration or fermentation. If such fermentation was permitted, not only would detrimental effects upon the enclosed perishable products ensue, but in addition to this a rise in temperature within the container would occur which would tend to hasten such detrimental effects so as to preclude safe preservation of the products during comparatively long periods of transportation, storage and handling otherwise attainable.

While I have specifically mentioned the use of chloride of lime and sodium perborate for the functional purposes above assigned to these chemical constituents of my novel distributing package or container, it will be obvious that any other kinds of chemical constituents or combinations thereof capable of effecting corresponding functions may be employed within the scope of my invention as hereinafter claimed.

In the use of the novel distributing package or container, as above characterized, after the perishable product is enclosed therein, the same may be suitably sealed against opening until reaching the hands of the consumer, and for this purpose one or more adhesively applied seals, such as indicated by the reference character 16, may be affixed to and between the closed body and cover sections of the container to guard the same against accidental or unauthorized separation.

From the above description it will be obvious that this invention provides a very effective container for transportation and storage of highly perishable products, such as cut flowers, fruits, vegetables, plants, etc; the same being capable of confining such products for comparatively long periods of time under conditions calculated to preserve their healthy vitality.

I am aware that many changes could be made in the above described construction and in the elements comprising the same both per se and in the mutual arrangement thereof, and, in fact, many widely different embodiments of this invention could be made without departing from the scope of the same as hereinabove set forth and as defined in the appended claims; it is intended, therefore, that all matter contained in the above description or shown in the accompanying drawings shall be interpreted as illustrative and not in a limiting sense.

I claim:

1. A container for the purposes described, comprising a body and a cooperative cover, said cover having an opening to render visible the content of the container, means to provide an effective seal against aqueous and gaseous interchange between the interior and exterior of the container when closed, a pervious cushioning element within the body to support the enclosed content, and a deposit of chemical constituents within the body and underlying said cushioning element, said constituents comprising an agent adapted to control the moisture content of the air confined within the container and an agent adapted to yield oxygen.

2. A container for the purposes described, comprising a body and a cooperative cover, said cover having an opening to render visible the content of the container, means to provide an effective seal against aqueous and gaseous interchange between the interior and exterior of the container when closed, and a deposit of chemical constituents within the container, comprising an intermixture of chloride of lime and sodium perborate in an initially dry state.

3. A container for the purposes described, comprising a body and a cooperative cover, said cover having an opening to render visible the content of the container, means to provide an effective seal against aqueous and gaseous interchange between the interior and exterior of the container when closed, a pervious cushioning element within the body to support the enclosed content, and a deposit of chemical constituents within the body and underlying said cushioning element, comprising an intermixture of chloride of lime and sodium perborate in an initially dry state.

4. A container for the purposes described, comprising a body and a cooperative cover, means to provide an effective seal against aqueous and gaseous interchange between the interior and exterior of the container when closed, a pervious cushioning element within the body to support the enclosed content, and a chemical deposit within the body and underlying the cushioning element, said chemical deposit comprising an agent to control moisture content of the air confined within the container and agent adapted to yield oxygen.

5. A container for the purposes described, comprising a body and a cooperative cover, means to provide an effective seal against aqueous and gaseous interchange between the interior and exterior of the container when closed, a pervious cushioning element within the body to support the enclosed content, and a chemical deposit within the body and underlying the cushioning element, said chemical deposit comprising an intermixture of chloride of lime and sodium perborate.

6. A container for the purposes described, comprising a body and a cover to telescopically engage over said body, an impervious flexible sealing sheet engaged between said body and cover when assembled in closed relation to provide an effective seal against aqueous and gaseous interchange between the interior and exterior of the closed container, a pervious cushioning element within the body to support the enclosed content, and a chemical deposit within the body, said chemical deposit comprising an agent to control moisture content of the air confined within the container and an agent adapted to yield oxygen.

7. A container for the purposes described, comprising a body and a cover to telescopically engage over said body, an impervious flexible sealing sheet engaged between said body and cover when assembled in closed relation to provide an effective seal against aqueous and gaseous interchange between the interior and exterior of the closed container, a pervious cushioning element within the body to support the enclosed content, and a chemical deposit within the body, said chemical deposit comprising an intermixture of chloride of lime and sodium perborate.

8. A container for the purposes described, comprising a body and a cover to telescopically engage over said body, said cover having an opening to render visible the content of the container, an impervious flexible sealing sheet of transparent material engaged between said body and cover when assembled in closed relation, said sheet underlying said cover opening, said sheet being adapted to provide an effective seal against aqueous and gaseous interchange between the interior and exterior of the closed container, a pervious cushioning element within the body to support the enclosed content, and a chemical deposit within the body, said chemical deposit comprising an agent to control moisture content of the air confined within the container and an agent adapted to yield oxygen.

9. A container for the purposes described, comprising a body and a cover to telescopically engage over said body, said cover having an opening to render visible the content of the container, an impervious flexible sealing sheet of transparent material engaged between said body and cover when assembled in closed relation, said sheet underlying said cover opening, said sheet being adapted to provide an effective seal against aqueous and gaseous interchange between the interior and exterior of the closed container, a pervious cushioning element within the body to support the enclosed content, and a chemical deposit within the body, said chemical deposit comprising chloride of lime and sodium perborate.

10. A container for the purposes described, comprising a body and a cover to telescopically engage over said body, said cover having an opening to render visible the content of the container, an impervious flexible sealing sheet of transparent material engaged between said body and cover when assembled in closed relation, said sheet underlying said cover opening, said sheet being adapted to provide an effective seal against aqueous and gaseous interchange, between the interior and exterior of the closed container, a pervious cushioning element within the body to support the enclosed content, and a chemical deposit within the body, said chemical deposit comprising an intermixture in dry state of chloride of lime and sodium perborate, and said chemical deposit being disposed intermediate said cushioning element and the bottom of said body.

11. In a container as defined in claim 3, means to temporarily secure said cover against opening release from said body.

12. In a container as defined in claim 7, means to temporarily secure said cover and body in assembled closed container forming relation.

13. A container for the purposes described having means to effectively seal the same against aqueous and gaseous interchange between the interior and exterior thereof, a supporting and cushioning means within said container for the content thereof, and a chemical deposit within the container comprising an agent to control moisture content of the air confined within the container and an agent adapted to yield oxygen.

14. A container for the purposes described having means to effectively seal the same against aqueous and gaseous interchange between the interior and exterior thereof, a supporting and cushioning means within said container for the content thereof, and a chemical deposit within the container, said chemical deposit comprising an intermixture of chloride of lime and sodium perborate.

15. A container for the purposes described capable of being effectively sealed against aqueous and gaseous interchange between the interior and exterior thereof, and a chemical deposit within the container comprising an agent to control moisture content of the air confined within the container and an agent adapted to yield oxygen.

16. A container for the purposes described capable of being effectively sealed against aqueous and gaseous interchange between the interior and exterior thereof, and a chemical deposit within the container, said chemical deposit comprising an intermixture of chloride of lime and sodium perborate.

In testimony, that I claim the invention set forth above I have hereunto set my hand this 16th day of May, 1932.

FRANCIS W. RUZICKA.